United States Patent
Kido et al.

(10) Patent No.: US 8,234,490 B2
(45) Date of Patent: *Jul. 31, 2012

(54) SERVER CERTIFICATE ISSUING SYSTEM

(75) Inventors: Keisuke Kido, Tokyo (JP); Ichiro Chujo, Tokyo (JP)

(73) Assignee: GlobalSign K.K., Tokyo (JP)

( * ) Notice: Subject to any disclaimer, the term of this patent is extended or adjusted under 35 U.S.C. 154(b) by 471 days.

This patent is subject to a terminal disclaimer.

(21) Appl. No.: 12/452,255

(22) PCT Filed: Jun. 25, 2008

(86) PCT No.: PCT/JP2008/061541
§ 371 (c)(1),
(2), (4) Date: Dec. 21, 2009

(87) PCT Pub. No.: WO2009/001855
PCT Pub. Date: Dec. 31, 2008

(65) Prior Publication Data
US 2010/0111300 A1    May 6, 2010

(30) Foreign Application Priority Data

Jun. 27, 2007 (JP) .................................. 2007-168777
Oct. 5, 2007 (JP) .................................. 2007-262485

(51) Int. Cl.
*H04L 29/06* (2006.01)
(52) U.S. Cl. .................. 713/156; 726/1; 726/5; 726/10; 726/18; 726/19
(58) Field of Classification Search .................... 713/156
See application file for complete search history.

(56) References Cited

U.S. PATENT DOCUMENTS 7,047,409 B1 * 5/2006 Aull et al. .................... 713/173
(Continued)

FOREIGN PATENT DOCUMENTS

CA    2 463 504    4/2003
(Continued)

OTHER PUBLICATIONS

Park et al., "Certificate validation service using XKMS for computational grid", Oct. 2003, Proceedings of the 2003 ACM workshop on XML security, pp. 112-120.*

(Continued)

*Primary Examiner* — Taghi Arani
*Assistant Examiner* — Kenneth Chang
(74) *Attorney, Agent, or Firm* — Carrier Blackman & Associates, P.C.; Joseph P. Carrier; William D. Blackman (57) ABSTRACT

In a server certificate issuing system according to the invention, the Web server includes a control panel which configures and manages a Web and a mail. The control panel is loaded with an entry screen generator to input application items for an issuance of a server certificate, password generator for generating a password which is used to encrypt, and a verification page generator to indicate intention of requesting the issuance of the certificate. On the verification page, the generated password is indicated as verification information for example. The registration server retrieves the password from the received server certificate request and accesses the Web server to read out the verification information indicated on the verification page, and compares the read verification information with the password. As the result of the verification, the verification information read from the Web server is identical to the password, the registration server decides that the Web server for which is to be issued the server certificate exists. Then, the registration server generates the key pair and the CSR and transmits the generated CSR to the certificate issuing server.

16 Claims, 7 Drawing Sheets

U.S. PATENT DOCUMENTS

| | | | |
|---|---|---|---|
| 2003/0126431 A1* | 7/2003 | Beattie et al. | 713/156 |
| 2005/0080899 A1* | 4/2005 | Vogel et al. | 709/225 |
| 2005/0081026 A1* | 4/2005 | Thornton et al. | 713/156 |
| 2006/0143442 A1* | 6/2006 | Smith | 713/156 |
| 2007/0067465 A1 | 3/2007 | Blinn et al. | |

FOREIGN PATENT DOCUMENTS

| | | |
|---|---|---|
| EP | 1 461 891 A1 | 9/2004 |
| JP | 10-340253 A | 12/1998 |
| JP | 2005-506737 T | 3/2005 |
| JP | 2005-512395 T | 4/2005 |
| WO | WO 03/032572 A1 | 4/2003 |
| WO | WO 03/049358 A1 | 6/2003 |

OTHER PUBLICATIONS

Taban et al. "Towards a secure and interoperable DRM architecture", Oct. 2006, Proceedings of the 2006 ACM workshop on Digital rights management, pp. 69-78.*

* cited by examiner

SERVER CERTIFICATE ISSUING SYSTEM

TECHNICAL FIELD

The present invention relates to a server certificate issuing system which issues a server certificate in response to a server certificate request transmitted from a Web server.

BACKGROUND OF THE INVENTION

In order to securely perform Internet communications between a Web server and a Web browser, SSL (Secure Socket Layer) using PKI (Public Key Infrastructure) has been put to practical use. In a communication system in which the SSL has been introduced, since an encryption process is performed by using a server certificate (SSL certificate) issued by a certificate authority (CA) which is a trusted third-party authority, spoofing, tamper, sniffing and the like are prevented and more secure Internet communications are assured.

When an application for the issuance of the certificate is made, a key pair of a public key and a private key is generated using a certificate issuance application function incorporated into the Web server or the Web browser. Subsequently, a Certificate Signing Request file (CSR) containing the public key is generated, and the issuance request of the server certificate is made by transmitting the generated CSR to the registration server. The registration server which has received the issuance request of the server certificate performs a verifying process for the user authentication and transmits the CSR to the certificate issuing authority, after the authenticity of the user who made the issuance request of the server certificate is confirmed. The certificate issuing authority performs digitally signing the public key contained in the signing request file to generate the server certificate and transmits the generated server certificate to the registration server. And then, the registration server informs the user that the server certificate is downloadable to the Web server.

When the certificate authority issues the server certificate, identification of a person requesting the issuance of the server certificate is important. As an identification method, a server certificate issuing system using domain validation has been put to practical use (for example, see Japanese Patent Laid-Open No. 2005-506737). In this known identification method, when the issuance of a server certificate is requested, the registration server accesses a database of a domain registration server (Whois information) to contact an approver having an authority to approve the issuance of the server certificate for the relevant Web server. Using communicating means such as telephone, e-mails or the like, whether or not the certificate request is approved is verified, and only if the approval from the approver is obtained, the certificate is issued.

DISCLOSURE OF THE INVENTION

Problem to be Solved by the Invention

In the conventional authentication method using the domain validation, a person having the authority to approve the issuance of the certificate is searched based on the Whois information, and the identification is performed based on the approval from the searched approver. However, in the authentication method of the Approver-Email system, merely the approval from the person having the authority to approve is obtained and existence of the Web server for which the certificate is issued is not confirmed, which has caused a security problem. Moreover, the identification with the e-mail has a potential risk of causing the security problem in the case where the e-mail has been sniffed or the like. Furthermore, since the registration authority has to access the database of the domain registration authority to search the approver, there has been also a disadvantage of a complicated identification task in the registration authority. In addition, confirmation of the approval has to be obtained with the communicating means such as the telephone, which has become a major impediment to automation of the issuance of the certificate.

Furthermore, in the conventional certificate issuing system, the user has to generate the key pair and the CSR. However, such operations are complicate and have imposed a large procedural burden on the user. If such complication is solved and the burden on the user is reduced, it is expected to put the SSL certificate to practical use.

It is an object of the invention to realize a server certificate issuing system in which existence of a Web server for which a certificate is to be issued can be confirmed and security is further improved.

Furthermore, it is another object of the invention to realize a server certificate issuing system in which the user authentication process can be automatically performed by a computer system and an issuance of a server certificate can be full-automatically performed.

It is another object of the invention to realize a server certificate issuing system in which a procedural burden on an applicant is significantly reduced.

Means for Solving the Problem

A server certificate issuing system according to the invention is a server certificate issuing system comprising a registration server installed in a registration authority to receive a server certificate request transmitted from a Web server via a network and to transmit a certificate signing request file (CSR) to an issuing authority after performing a predetermined examination, and a certificate issuing server provided in the issuing authority to receive the CSR transmitted from the registration server, to generate a server certificate with a digital signature, and to transmit the generated server certificate to said registration server, wherein said Web server comprises means for generating the server certificate request containing at least the address information of said Web server, means for transmitting the server certificate request to the registration server provided in the registration authority, verification page generating means for generating a verification page and indicating a verification information used for user authentication on said verification page, and said registration server comprises means for receiving the server certificate request transmitted from said Web server, means for accessing the verification page of the Web server based on the address information contained in the received server certificate request to read out the verification information indicated on the verification page, verification means for comparing the read verification information with the information contained in the server certificate request to verify whether or not the verification page has been generated, means for generating a key pair of a public key and a private key, means for generating the CSR including the generated public key, means for transmitting the generated CSR to the certificate issuing server, means for receiving the server certificate transmitted from the certificate issuing server, and server certificate transmission means for transmitting the received server certificate to said Web server, and wherein said registration server transmits the CSR to the certificate issuing server only when said verification means has judged that the verification page has been generated, as the result of the verification.

In the prior server certificate issuing system, since the user authentication is performed by using the email or the telephone, there have been problems of the security. For instance, according to the system in which the user authentication is performed by using the email or the telephone, the intention of the applicant can be confirmed, but the existence of the Web server for which the server certificate is to be issued cannot be confirmed, which has caused the security problem. In addition, in the conventional user authentication system in which the operation of the user authentication is performed by use of the email, telephone or postal service, since the person in charge has to manually perform the identification work, which has caused a major impediment to automation of the issuance of the certificate. Moreover, accessing the domain registration authority used to confirm the existence of the Web server, the procedural task performed by the registration authority has been very complicated. In order to overcome such problem, the invention has its object to realize the server certificate issuing system in which user authentication is performed with higher security and the certificate is automatically issued in the computer system.

In order to achieve the above object, the server certificate issuing system according to the invention comprises following features.

(a) The Web server generates the verification page used for the user authentication in the Web server for which the server certificate is to be issued and indicates the verification information on the verification page in response to transmit the server certificate request to the registration server.

(b) When receiving the server certificate request, the registration server accesses the verification page of the Web server specified by the address information included in the received server certificate request and reads out the shown verification information. Then, the registration server compares the read verification information with the information included in the server certificate request (for example, encrypted random verification data) in order to verify the responding relation between the verification page and the server certificate request and confirm the authenticity of the verification page. In this case, it is important that the registration server not only reads out the verification information from the verification page of the Web server but also compares the read verification information with the information contained in the server certificate request to confirm the authenticity of the verification page. That is, if the registration server provided in the registration authority accesses the verification page of the Web server based on the address information contained in the server certificate request to read out the verification information, the existence of the Web server for which the server certificate is to be issued can be confirmed. However, the authenticity of the verification page cannot be confirmed only by such procedure. On the contrary, if the verification information which was read from the verification page is compared with the information contained in the server certificate request, the corresponding relation between the server certificate request and the verification page can also be grasped, and thus the authenticity of the verification page can be confirmed as well. Moreover, the intention of requesting the issuance of the server certificate is also confirmed.

Furthermore, if the registration server accesses the verification page to read out the verification information and to compare the read information with the information included in the server certificate request, as the user authentication procedure performed in the registration server, it is possible automatically to authenticate the identity of the person by use of the computer system provide in the registration authority (the registration server), and thus it becomes possible that the whole processes of the server certificate issuance system are carried out full-automatically. That is, the information contained in the server certificate request is electronic data and the verification information read from the verification page is also electronic data. Therefore, it becomes possible in the computer system provided in the registration server to execute the processes of the user authentication as an automated series of processes by comparing the two kinds of electronic data which have been obtained through the different channels.

In this way, the characteristic features of the invention are (a) the Web server forms the verification page in the Web server while the server certificate request is transmitted, (b) the registration server accesses the verification page of the Web server to read out the verification information, and (c) the registration server compares the read verification information with the information contained in the server certificate request. The objects of automation of the server certificate issuance system and improvement of security are realized by combining above three specific features together, but the aim of the invention cannot be realized in case of lacking one or more of the above three features.

In a preferred embodiment of the server certificate issuing system according to the invention, the Web server comprises verification data generating means for generating verification data, and the verification page generating means indicates the verification data generated by the verification data generating means on the verification page as the verification information, and wherein said server certificate request generating means generates the server certificate request including the generated verification data, and wherein the verification means of the registration server compares the read verification information with the verification data contained in the server certificate request to verify whether or not the verification page has been generated. As the verification data, a random verification data generated based on random numbers may be used.

The verification data may be generated by use of a predetermined rule or encrypting arithmetic formula. For instance, the contents of the random verification page can be generated by combining the information having only one meaning and contained in the server certificate request such as FQDN (the common name of the Web server), application ID, user ID or application date and by performing encrypting calculation (for example using HASH function SHA-1) for the combined data to form HASH-processed data, generated as the content of random verification page. After generating the verification page, the Web server adds the URL information (title) of the verification page in the certificate request, transmits the server certificate request, and notifies the registration server of it.

Then, the registration server derives the URL information (title), generates the URL including FQDN (the common name of the Web server) and reads out the random verification page with http protocol. The existence of the verification page can be confirmed by reading the contents of the random verification page. Then, the authenticity of the random verification page can be confirmed by verifying the identification between the contents of the random verification page and the data of the arithmetic result which are calculated with the predetermined rule or encrypting arithmetic formula. Such data of the arithmetic result are obtained by calculating the application ID, user ID and application date with HASH function SHA-1.

In an another preferred embodiment of the server certificate issuing system according to the invention, the Web server comprises password generating means for generating a password, said server certificate request generating means generates the server certificate request including the generated password, and the server certificate transmitting means of the registration server encrypts the server certificate and the corresponding private key using the password contained in the server certificate request and downloads the encrypted server certificate and private key to the Web server. According to the invention, since the server certificate issued by the certificate issuing authority and the private key are encrypted by use of the password contained in the server certificate request and downloaded from the registration server to the Web server, issued certificate and the private key are downloaded in the high security environment.

In another preferred embodiment of the server certificate issuing system according to the invention, the Web server comprises means for encrypting the generated password, said server certificate request generating means generates the server certificate request including the encrypted password, and the registration server comprises means for decrypting the encrypted password contained in the server certificate request to encrypt the server certificate and the corresponding private key using the decrypted password.

In a preferred embodiment of the server certificate issuing system according to the invention, the Web server comprises status inquiry means for inquiring of the registration server as to the issuance status of the server certificate, and performs the status inquiry periodically using an assigned application ID as a key. The Web server and the registration server are coupled by a SOAP interface with a pair of a request and a response, and the security is assured by encrypted communications and robust authentication with SSL communications. A result of verifying the verification page is immediately returned to the Web server as a response to the certificate request. Input errors in the FQDN or the like are notified at the time of the application.

In another preferred embodiment of the server certificate issuing system according to the present invention, the Web server comprises a control panel to mainly configure and manage the Web and a mail, and the means for generating the entry screen to input the application information for the issuance of the server certificate, means for generating the password, means for generating the verification page, and the status inquiry means are loaded on the control panel.

According to the invention, the issuance and management of the server certificate can be performed under the control of the control panel which is provided in the Web server and mainly configures and manages the Web and the mail. Particularly, since the means for generating the entry screen to input the application information for the issuance of the server certificate, the means for generating the password, the means for generating the verification page, and the status inquiry means are loaded on the control panel, processes from the application for the issuance of the server certificate to installation of the issued server certificate can be automatically executed in series by utilizing these means.

In another preferred embodiment of the server certificate issuing system according to the invention, the registration server further comprises means for receiving the server certificate transmitted from the certificate issuing server, means for storing the received server certificate in a download area, means for responding to the certificate status inquiry transmitted from the above described Web server, and download means for downloading the server certificate stored in the download area to the Web server, and when the registration server receives the certificate status inquiry from the Web server, if a corresponding server certificate is stored in the download area, as a response to the above described status inquiry, the server certificate stored in the download area is downloaded to the Web server, and wherein the processes from the application for the issuance of the server certificate to the downloading of the issued server certificate to the Web server are automatically executed in series.

ADVANTAGEOUS EFFECT OF THE INVENTION

According to the invention, when the registration server has received the server certificate request, the registration sever accesses the Web server identified by the FQDN to read out the verification information indicated on the verification page, and judges the authenticity of the verification page by comparing the read verification information with the application information contained in the server certificate request. Thereby, the existence of the Web server for which the server certificate is to be issued is confirmed, and the intention of the administrator of the Web server to request the issuance of the server certificate is also confirmed. As a result, the higher security than the conventional domain validation method is assured.

Furthermore, it is possible to execute the processes from the application for the issuance of the server certificate to the installation of the issued server certificate as an automated series of processes by loading a server certificate issuing program on the control panel provided in the Web server.

Furthermore, since the key pair and the CSR are generated by the registration server, the procedural burden on the user is significantly reduced.

EXPLANATION OF NUMERALS 1 network
10 registration server
11 certificate issuing server
20,50 communication means
21 control panel
22 mail function section
23 Web function section 24 database
25 SSL certificate issuing control program
30 means for generating entry screen information
31 means for generating verification data
32 means for generating a verification page
33 means for generating server certificate request
34 means for generating password
35 encrypting means
36 storage area
37 status inquiry means
38 download requesting means
39 server certificate storing means
40 decrypting means
41 installing means
51 means for receiving the server certificate request
52 ID assigning means
53 storage means
54 examination means
55 means for retrieving verification data
56 verifying means
57 URL generating means
58 means for reading verification information
59 means for responding to certificate issuance request
60 means for deriving a password
61 means for decrypting a password
62 means for generating a key pair
63 means for generating a CSR
64 means for transmitting a CSR
65 means for receiving a server certificate
66 means for encrypting a server certificate
67 download area
68 means for receiving certificate status inquiry
69 means for transmitting status response
70 means for receiving certificate download request
71 means for downloading a server certificate

DETAILED DESCRIPTION OF THE PREFERRED EMBODIMENTS

Figure 1:
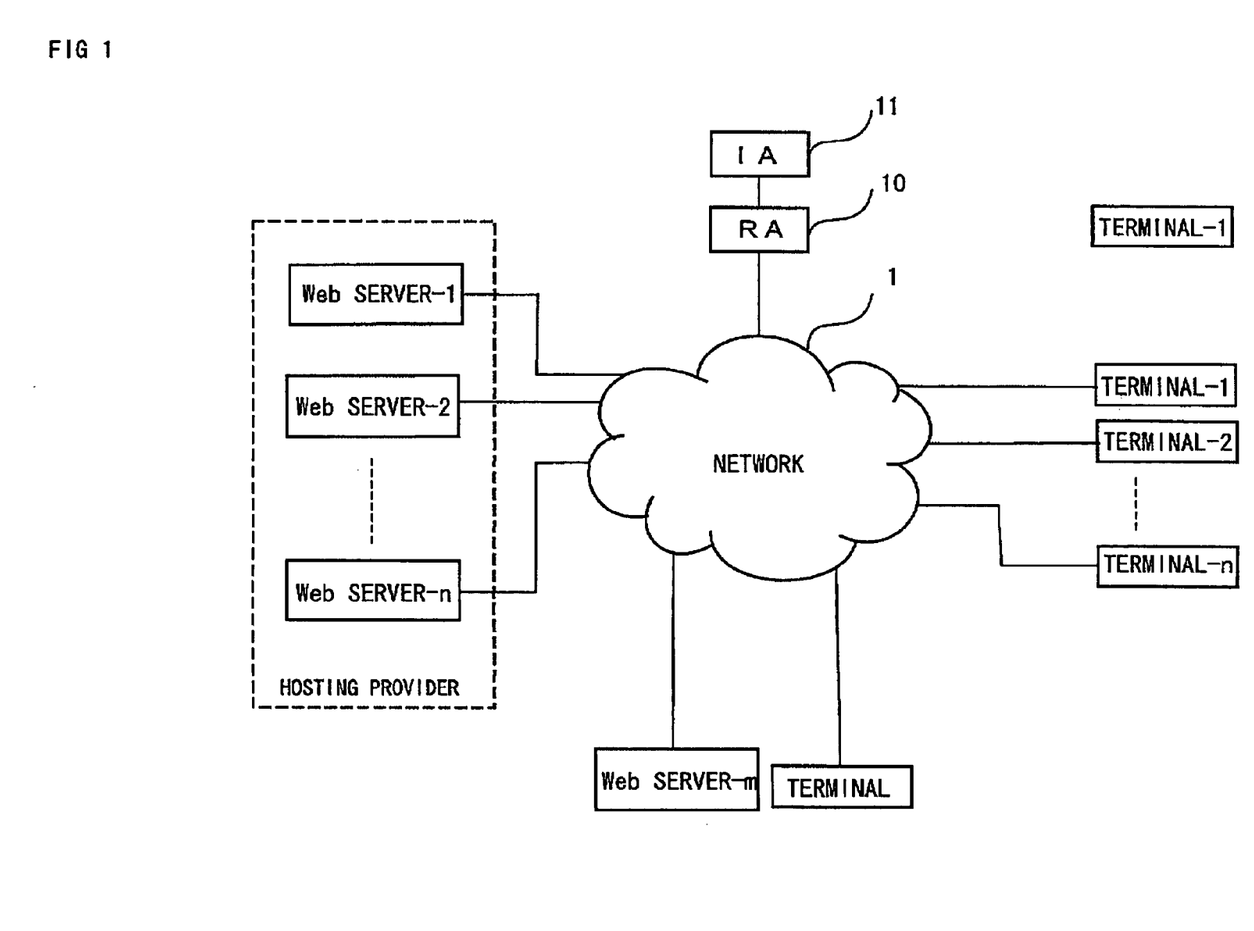
FIG. 1 is a diagram showing an overall configuration of a server certificate issuing system according to the invention.

FIG. 1 is a diagram showing an overall configuration of a server certificate issuing system according to the invention. To a network 1, n Web servers 1 to n under the control of a hosting provider are connected, and another Web server m owned by a person other than the hosting provider is also connected. The Web servers 1 to n under the control of the hosting provider are used via the network 1 and respective terminals 1 to n by each server administrators having management authority for the respective Web server. Moreover, the Web server m is managed via the network 1 and another terminal m by an administrator of the server. Furthermore, a registration server 10 provided in a registration authority which accepts a server certificate request is connected to the network 1. Furthermore, the registration server 10 is connected to a certificate issuing server 11 provided in an issuing authority (IA) via the network. The certificate issuing server 11 receives a CSR transmitted from the registration server 10, and provides a digital signature to issue a server certificate. The issued certificate is transmitted to the registration server, and is downloaded to the relevant Web server via the network.

In this example, functions from the server certificate request to downloading of the issued certificate are incorporated into a control panel. In each Web server, the control panel for mainly configuring and managing the Web and the mail is incorporated, and the application and management of the SSL certificate are performed under the control of the control panel in this example. For example, if the administrator of the Web server 1 desires the issuance of the server certificate, the administrator accesses the Web server 1 managed by him/her via the terminal 1 and the network to display a menu of the control panel. Then, the administrator clicks on a menu "Issuance of SSL Certificate" in the displayed menu. When the menu "Issuance of SSL Certificate" is clicked, the control panel displays an entry screen to input application information for the server certificate. The application information for the issuance of the server certificate includes at least the following information:

a common name (FQDN: Fully Qualified Domain Name) or an IP address of the Web server;

a name and an e-mail address of an application administrator; and a validity start date and a validity period of the certificate.

When necessary application information has been completely inputted, the control panel determines that the server certificate request has been made, and generates a server certificate request. The generated server certificate request is transmitted to the registration server 10 via the network, and an examination including user authentication is performed in the registration server. If the certificate issuance request satisfies predetermined requirements, the registration server 10 generates a key pair of a private key and a public key, and further generates the CSR including the public key and transmits the generated CSR file to the certificate issuing server 11 provided in the issuing authority. The certificate issuing server provides a digital signature to generate the server certificate. The generated server certificate is transmitted to the registration server 10 and stored in a download area, and the registration server notifies the Web server 1 of completion of the downloading. When receiving the download notification, the control panel of the Web server 1 transmits a download request to the registration server and installs the downloaded server certificate therein. In other words, in this example, after the certificate request is inputted by the administrator of the Web server, processes from the application for the issuance of the certificate to the installation of the server certificate are executed in series under the control of the control panel incorporated in the Web server. Therefore, the sequential processes of issuing the server certificate are automated and a burden on a user is significantly reduced. Furthermore, since encrypted session is established between the Web server and the registration server, the data are transmitted and received under encrypted communication environment.

Figure 2:
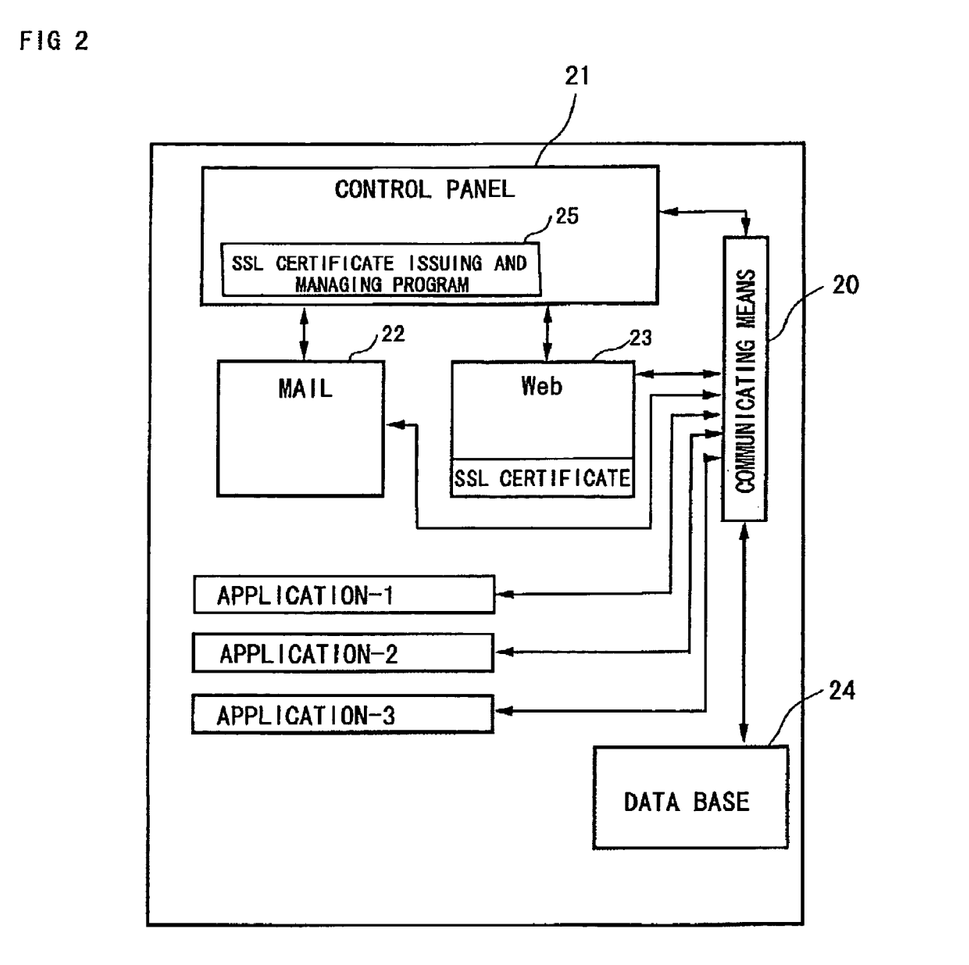
FIG. 2 is a diagram showing an example of a Web server according to the invention.

FIG. 2 is a diagram showing a configuration of an example of the Web server according to the invention. The Web server comprises communication means 20, and communicates with a user terminal via the communication means 20. Furthermore, the Web server has a control panel 21, and the mail and the Web are configured and managed by the control panel 21. Therefore, a mail function section 22 and a Web function section 23 are configured and managed by the control panel 21. In the Web server, applications 1 to 3 are incorporated and also a database 24 is incorporated.

The control panel 21 is provided with an SSL certificate issuing and managing program 25, and under the control of this SSL certificate issuing and managing program 25, the processes from the application for the issuance of the server certificate to the installation of the issued server certificate are executed in series.

Figure 3:
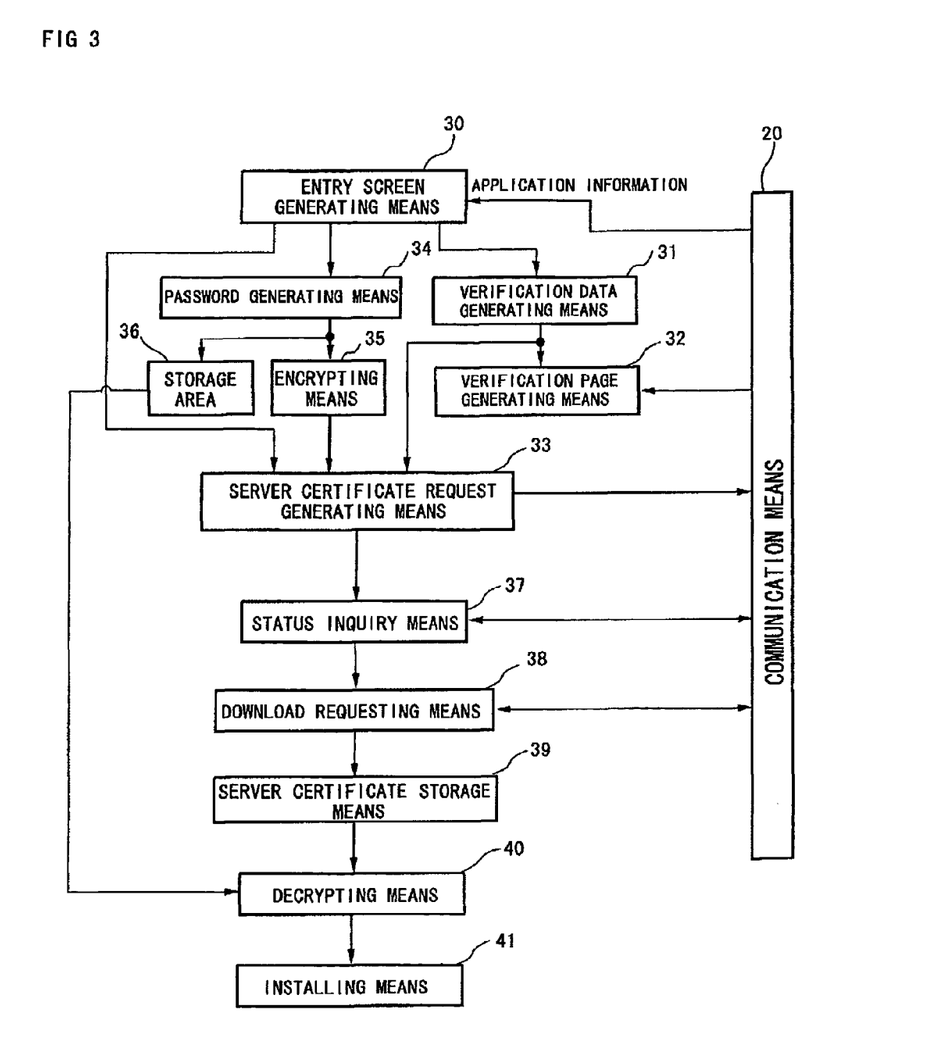
FIG. 3 is a diagram showing an example of an SSL certificate issuing and managing program loaded in the Web server.

FIG. 3 is a diagram showing functions of the SSL certificate issuing and managing program 25 of the control panel 21. In this example, random verification data are used as verification information for the user authentication. When the administrator accesses the Web server to request the issuance of the certificate, entry screen generating means 30 is started, and the entry screen which is used to input the application information required for issuing the certificate is displayed on a monitor. When the server administrator has completely inputted the application information, verification data generating means 31 operates to generate the random verification data. Such verification data are the verification information which is used for user authentication and is generated by use of random numbers for example. The generated verification data are supplied to verification page generating means 32 and server certificate request generating means 33. The verification page generating means 32 generates a verification page to indicate intention of the application for the issuance of the certificate, and displays the generated verification data as the verification information.

When the application information has been completely inputted, password generating means 34 operates to generate a password which is used for encrypting the server certificate which is to be downloaded. This password is supplied to encrypting means 35 and is stored in a storage area 36. The password stored in the storage area 36 is used to decrypt the server certificate downloaded from the registration server. The encrypting means 35 encrypts the generated password using the public key of the registration server to generate the encrypted password. The encrypted password is transmitted to the server certificate request generating means 33. Between the Web server and the registration server, the encrypted session is established and higher security is assured. Thereby, although the password which is not encrypted is used, high security is ensured. Therefore, the password not being encrypted can be used. In this case, the password generated by the password generating means 34 is directly supplied to the server certificate request generating means.

The information contained in the application information, such as the common name (FQDN: Fully Qualified Domain Name) of the Web server, the name and the e-mail address of the application administrator, and the validity start date and the validity period of the certificate is transmitted to the server certificate request generating means 33. Then, in the server certificate request generating means 33, the server certificate request containing the verification data and the encrypted password is generated and is transmitted to the registration server 10 provided in the registration authority, via the communication means 20 and the network 1. In this example, the URL of the verification page is generated by the registration server.

The SSL certificate issuing and managing program comprises status inquiry means 37 for periodically inquiring of the registration server 10 as to the issuance status of the certificate and receiving the response from the registration server, after transmitting the server certificate request. Furthermore, the SSL certificate issuing and managing program comprises server certificate download requesting means 38 for transmitting the download request to the registration server when the download notification has been transmitted from the registration server. The downloaded server certificate is stored in server certificate storage means 39.

Figure 4:
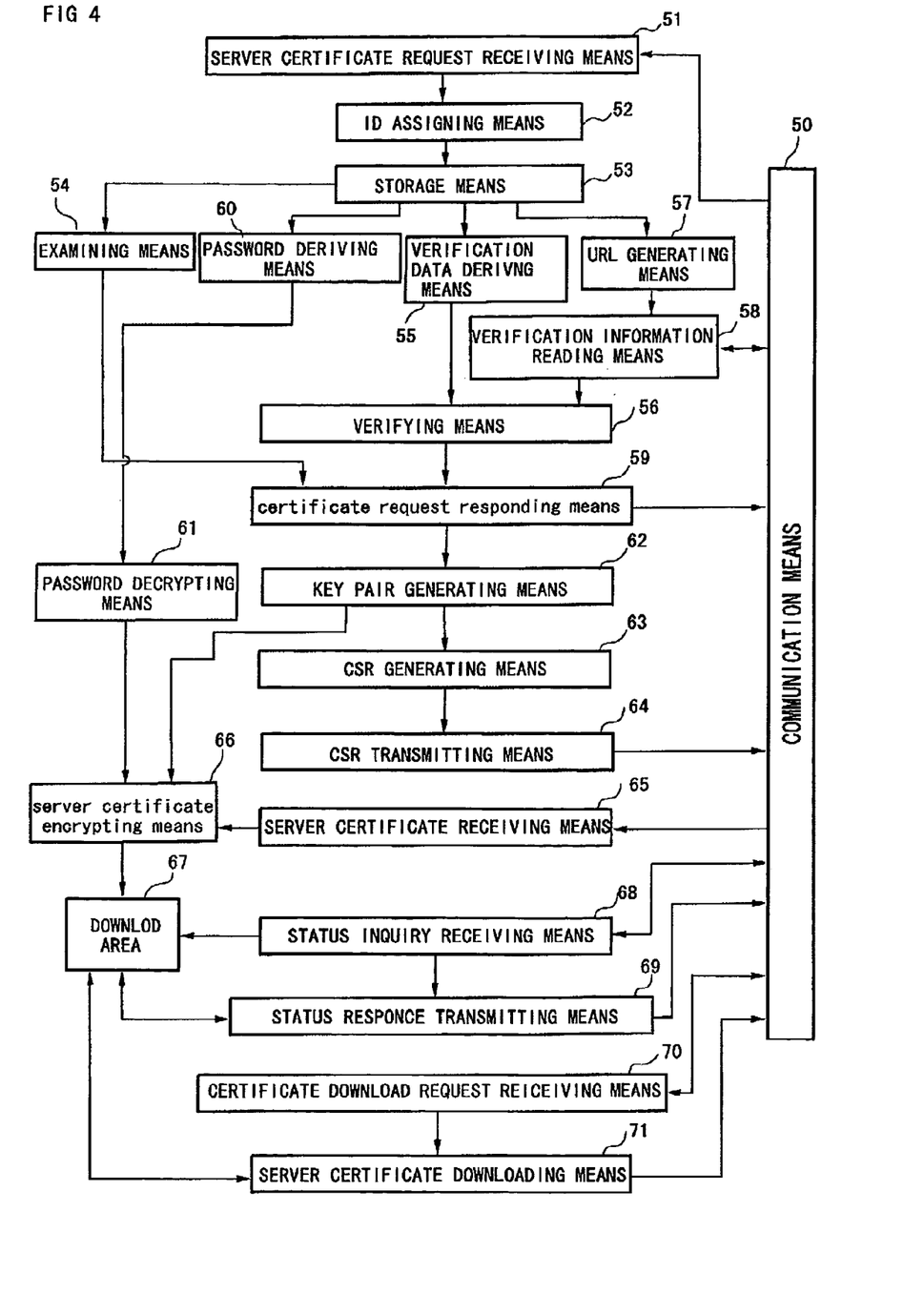
FIG. 4 is a diagram showing an example of a computer system of a registration server.

FIG. 4 is a diagram showing an example of a computer system of the registration server 10 provided in the registration authority. The certificate issuance request transmitted from the Web server is received by certificate request receiving means 51 via communication means 50. The received certificate request is assigned application ID by ID assigning means 52 and is temporally stored in the storage means 53. The certificate issuance request temporally stored in the storage means is sequentially read out and is examined by examining means 54. The examining means 54 checks the format of the certificate request, and decides whether or not predetermined application items are included. If the predetermined items are not included therein, such certificate request is processed to be an error.

Then, verification information deriving means 55 operates to take out the verification data from the received server certificate request, and transmits the derived verification data to verification means 56. Moreover, the FQDN is derived from the application information and transmitted to URL generating means 57. The URL generating means 57 generates URL information of the verification page formed in the Web server. This URL information is generated using the FQDN and a page title (page address information) contained in the application information. The generated URL is transmitted to verification information reading means 58. The verification information reading means 58 accesses the verification page of the Web server identified by the generated URL to read out the verification information indicated thereon, and transmits the verification information to the verification means 56.

The verification means 56 compares the verification data derived from the server certificate request with the verification information read from the verification page of the Web server to confirm whether or not they are identical to each other. If they are not identical to each other, such server certificate request is processed to be an error, and the error is transmitted from certificate request responding means 59 to the Web server. On the other hand, if the extracted verification data are identical to the verification information read from the Web server, this server certificate request is regarded as valid, and the certificate request responding means 59 transmits an acceptance completion notification to the Web server.

Furthermore, password deriving means 60 operates to take out the password from the server certificate request stored in the storage means 53. The derived password is transmitted to password decrypting means 61.

As the result of the verification process, when the received server certificate request is regarded to be valid, key pair generating means 62 operates to generate the key pair of the public key and the private key. The generated public key is transmitted to CSR generating means 64 to generate the CSR including the public key. The generated CSR is transmitted from CSR transmitting means 63 to the certificate issuing server 11 provided in the certificate issuing authority (IA) via the communication means 50 and the network.

When receiving the CSR transmitted from the registration server, the certificate issuing server 11 provides with the digital signature to generate the server certificate (SSL certificate) and transmits the generated server certificate to the registration server via the network.

The registration server receives the server certificate transmitted from the certificate issuing server by server certificate receiving means 49, and the received server certificate is transmitted to server certificate encrypting means 66. The password taken out by the password deriving means 60 is transmitted to the password decrypting 61 and is decrypted using the private key paired with the public key of the registration server. The decrypted password is transmitted to the server certificate encrypting means 66. And, the private key generated by the key pair generating means 62 is also transmitted to the server certificate encrypting means 66. The server certificate encrypting means 66 encrypts the received server certificate and the private key using the decrypted password to form an encrypted file called as Pkcs (Public-Key Cryptography Standard) 12 file which is established as international standard. Encrypting and decrypting program which encrypts into Pkcs 12 file and decrypts the Pkcs 12 file is incorporated into the Web server as standard environment of Java (registered trade mark) and Windows (registered trade mark). Therefore, the encrypted server certificate and private key can be decrypted using the password in the Web server. The encrypted server certificate and private key are stored in download area 67. In case that the password which has not been encrypted is used to encrypt the generated server certificate, the password decrypting means 61 is not necessary.

The registration server comprises means 68 for receiving the certificate status inquiry transmitted from the Web server. When receiving the status inquiry from the Web server, the status inquiry receiving means 68 confirms whether or not the server certificate is stored in the download area 67 using an application ID as a key. If the server certificate is not stored, noncompletion is notified to the Web server via status response transmitting means 69. If the server certificate is stored, the download notification is transmitted via the status response transmitting means. The download request from the Web server is received by certificate download request receiving means 70. When the download request from the Web server is received, the server certificate is downloaded to the Web server by server certificate downloading means 71 via network.

It should be noted that, if the server certificate is stored in the download area at the time of receiving the status inquiry from the Web server, the server certificate can be downloaded via the status response transmitting means 69 as a status response.

Referring to FIG. 3, the server certificate and the private key which are converted into the Pkcs 12 file format and is downloaded from the registration server are stored in the server certificate storage means 39. The stored Pkcs 12 file is supplied to the decrypting means 40 and is decrypted into the server certificate and the private key using the password stored in the storage area 36. Upon decrypting, the decrypting means 40 decrypt the Pkcs 12 file by use of decryption conversion program corresponding to the encryption conversion program which is used by the registration server. The decrypted server certificate is installed by the installing means 41. And, the decrypted private key is managed server securely. If the Web server is incorporated with interne information service (IIS) of Microsoft, the server certificate can be installed by directly inputting a password corresponding to the server certificate of Pkcs 12 format.

Figure 5:
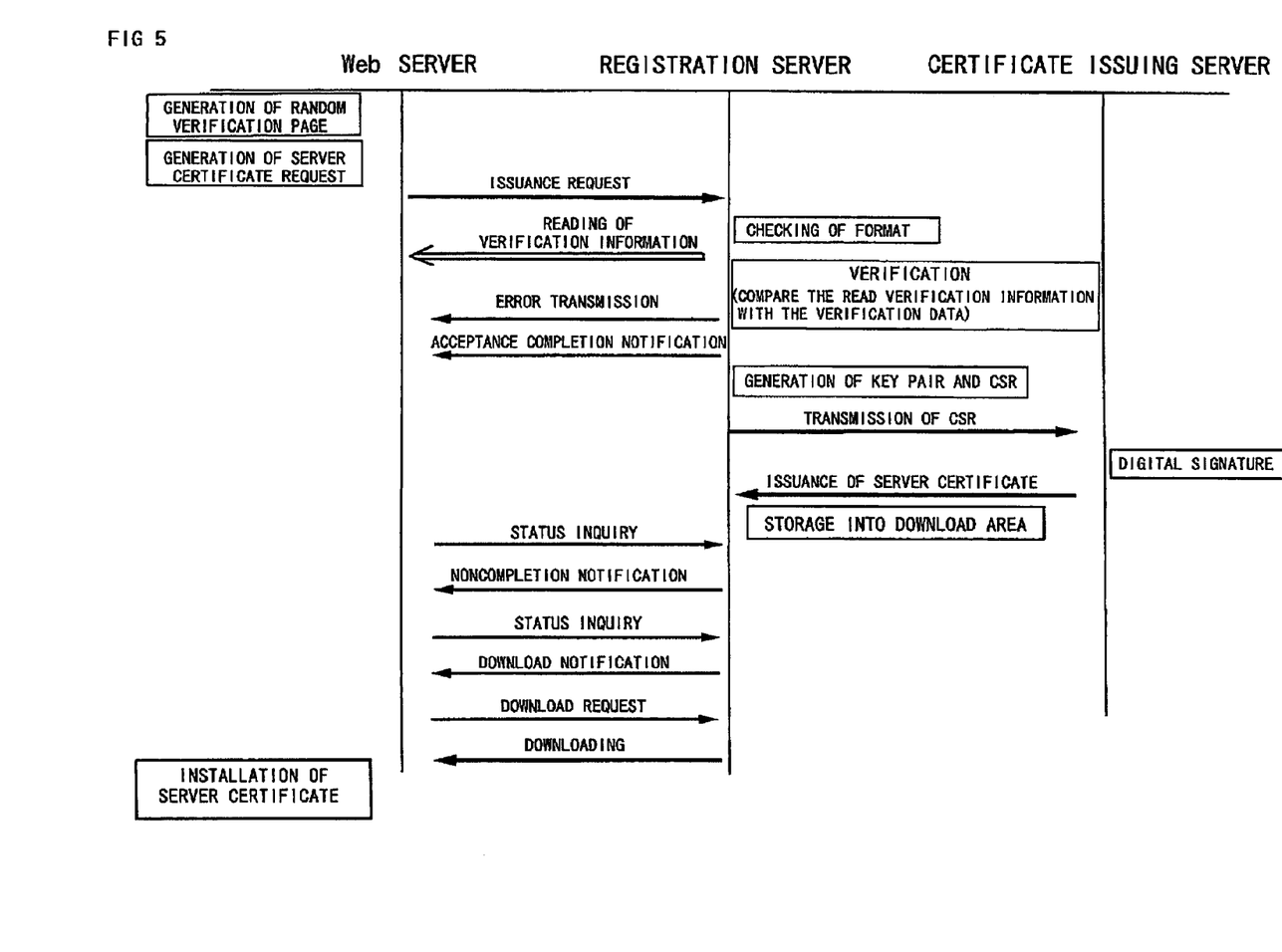
FIG. 5 is a diagram showing a series of operations and processes among the Web server, the registration server and a certificate issuing server.

FIG. 5 is a diagram showing a procedure of the processes from the application for the issuance of the server certificate to the downloading of the server certificate, among the Web server, the registration server and the certificate issuing server. When making the application for the issuance of the server certificate, the administrator or the person having authority to use of the Web server accesses the Web server managed by him/her to display the entry screen, and inputs the predetermined application matters. Under the control of the control panel, the Web server generates the encrypted password and the random verification data, and also generates the server certificate request. Then, the Web server produces the verification page and indicates the verification data on the verification page. The server certificate request is transmitted to the registration server 10 via the network.

Firstly, the registration server checks the format of the server certificate request, and if there is an error in the inputted information, the registration server transmits the error. Next, the registration server accesses the verification page of the Web server to read out the verification information, and performs the verification process by comparing the read verification information with the verification data contained in the server certificate request. As a result of the verification, if the read verification information is not identical to the verification data, the registration server transmits the error. If the read verification information is identical to the verification data, the registration server transmits the acceptance completion notification to the Web server. Furthermore, the registration server generates the key pair and the CSR including the public key, and transmits the CSR to the certificate issuing server 11.

The certificate issuing server provides the received CSR with the digital signature to generate the server certificate, and transmits the generated server certificate to the registration server.

The registration server decrypts the encrypted password contained in the server certificate request. Then, the registration server encrypts the received server certificate and the private key using the decrypted password to form the Pkcs 12 file. The encrypted Pkcs 12 file including the encrypted server certificate and private key is stored in the download area.

The registration server receives the status inquiry periodically transmitted from the Web server, and confirms whether or not the server certificate is stored in the download area. If the server certificate is not stored, the registration server transmits the noncompletion notification to the Web server as the response. If the server certificate is stored in the download area, the registration server transmits the download notification to the status inquiry as the response. When receiving the download notification, the Web server transmits the download request to the registration server. In response to the download request, the registration server downloads the corresponding server certificate to the Web server.

Under the control of the control panel, the Web server installs the downloaded server certificate therein. That is, the Web server decrypts the downloaded server certificate and the private key using the password, and stores the private key in the managing area and also installs the server certificate using the installing means 37. It should be noted that if automation of the downloading and the installation of the issued server certificate is not desired, it is also possible to download and install the issued server certificate with another means after receiving the download notification from the registration server.

In this way, in the server certificate issuing system according to the invention, the processes up to the installation of the server certificate are automatically executed only by inputting the matters required for the issuance of the server certificate by the administrator or the person having authority to use of the Web server, and thereby a procedural burden on the administrator is significantly reduced.

Figure 6:
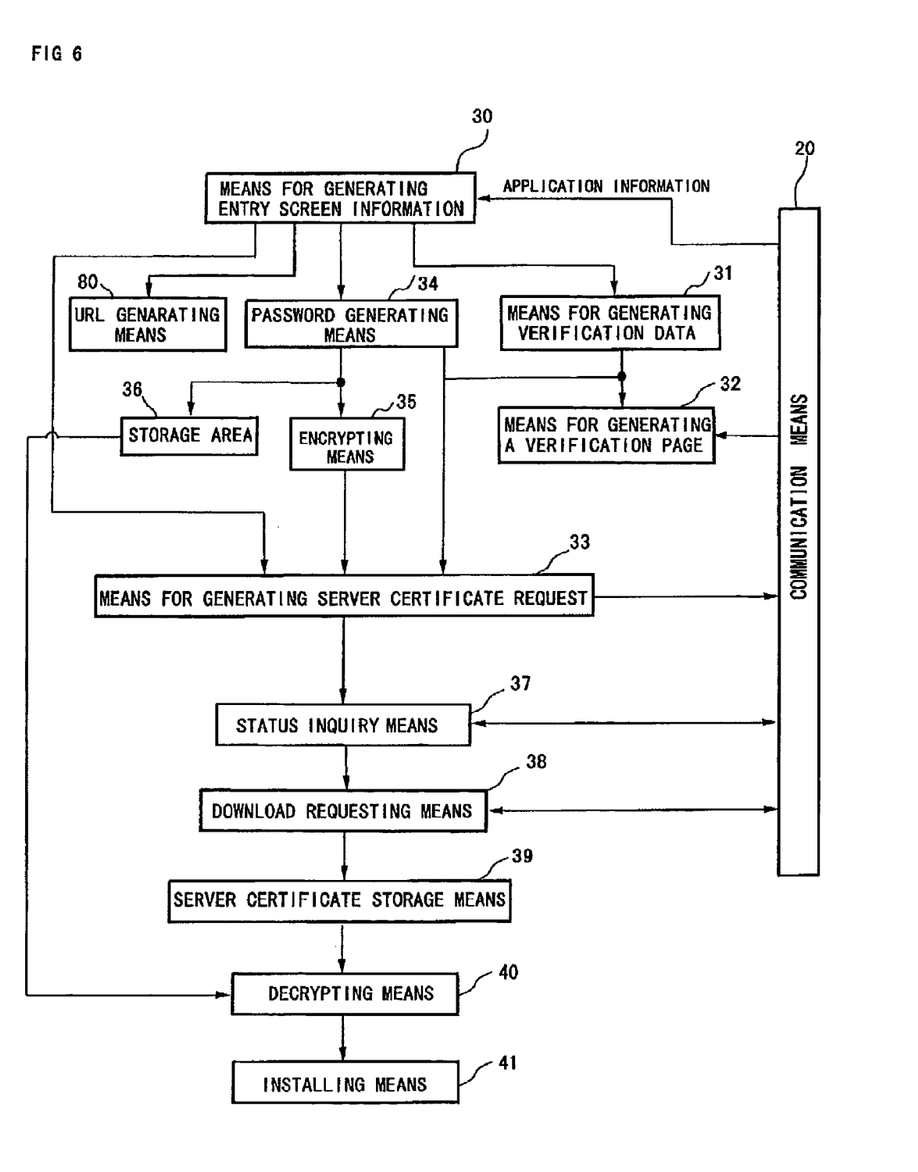
FIG. 6 is a diagram showing a variation of the SSL certificate issuing and managing program loaded in the Web server.
Figure 7:
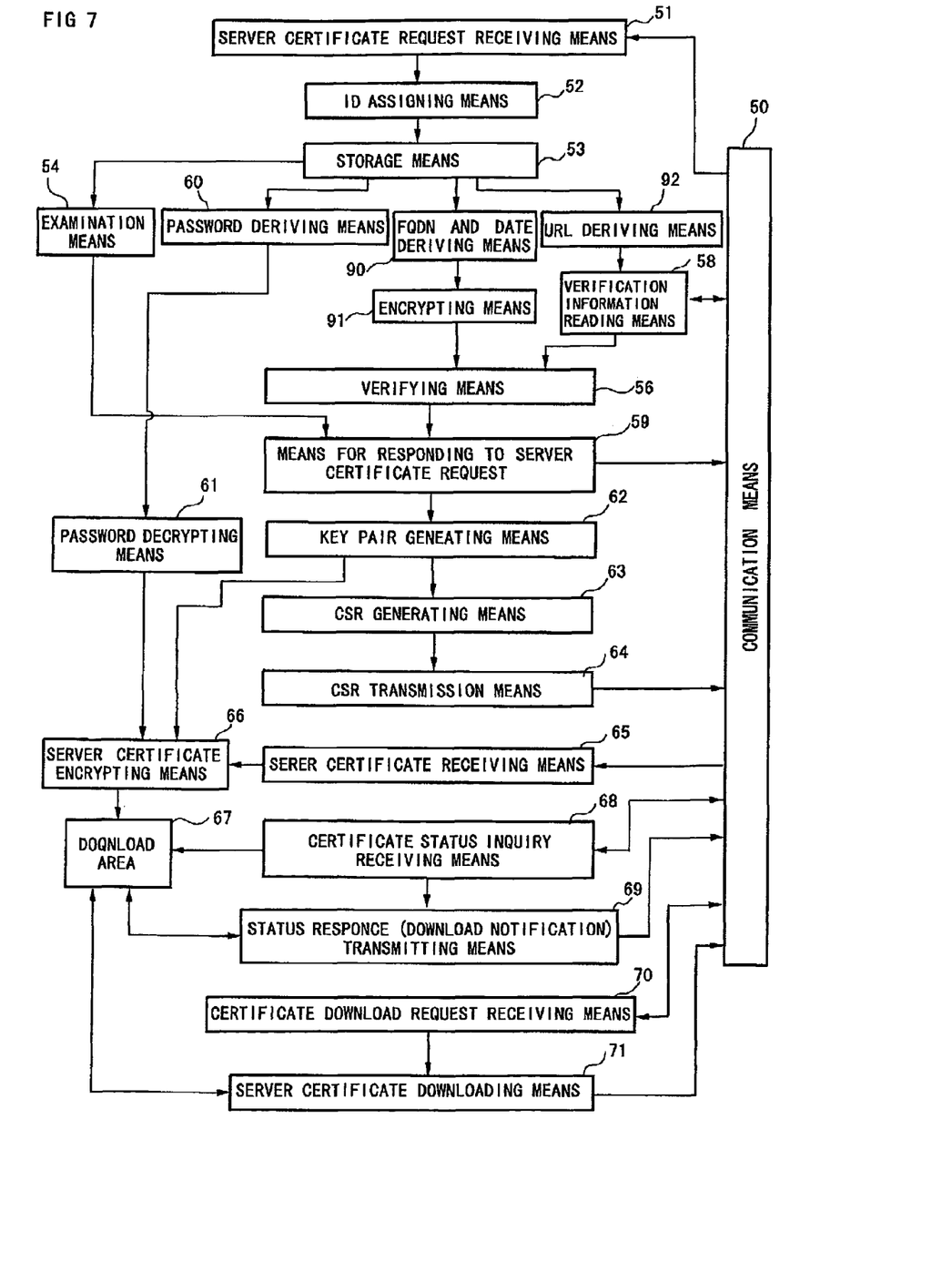
FIG. 7 is a diagram showing a variation of the computer system of the registration server.

FIGS. 6 and 7 show a variation of the server certificate issuing system according to the invention. FIG. 6 is a diagram showing the computer system of the Web server, and FIG. 7 is a diagram showing the computer system of the registration server. It should be noted that the same reference numerals are assigned to the same component as those used in FIGS. 3 and 4 in the following description. The verification information used for the user authentication is not limited to the random verification data generated from the random number, and can be generated by use of various information or data which is unique to the Web server. In this example, the FQDN of the Web server and the application date are used as the verification information, and such information is encrypted using the public key of the registration authority, and the generated encrypted data are used as the verification information. Referring to FIG. 6, the FQDN of the Web server and the application date contained in the application information which is inputted into the entry screen information generating means 30 are supplied to the verification data generating means 31. The verification data generating means 31 encrypts the FQDN of the Web server and the application date using the public key of the registration authority to generate the verification data. The generated verification data are transmitted to the verification page generating means 32 and are indicated on the verification page.

Furthermore, in this example, URL of the verification page is generated on the Web server side. The FQDN contained in the application information is transmitted to URL generating means 80 to generate the URL information of the verification page. URL generating means 80 generates the URL information of the random verification page using the FQDN and the title of the page (page address information) contained in the application information. The generated URL is transmitted to the server certificate request generating means 33. The server certificate request generating means 33 transmits the server certificate request including the URL of the random verification page to the registration server.

With reference to FIG. 7, in the registration server, FQDN and date deriving means 90 takes out the FQDN and the application date from the server certificate request and transmits them to encrypting means 91. The encrypting means 91 encrypts the FQDN and the date by use of the public key of the registration authority and transmits encrypted data to the verifying means 56. The URL of the random verification page is taken out by URL deriving means 92 and is transmitted to the verification information reading means 58. The verification information reading means 58 accesses the verification page of the Web server identified by the URL included in the server certificate request and reads out the verification information, and transmits the read verification information to the verifying means 56. The verification means 56 compares the verification information read from the random verification page of the Web server with the encrypted data transmitted from the encrypting means to perform the verification process. As a result of the verification, if the encrypted data and the verification information read from the Web server are identical to each other, it is determined that the Web server for which the server certificate is to be issued exists, and subsequent processes are continued. In this way, the security is also assured although various encrypted information is used as the verification information.

In the case of accessing the Internet, the common name (FQDN) of the server is converted into the IP address, and a telegram is routed to a targeted server. The conversion (mapping) between the common name and the IP address is handled by a DNS. The Mapping information is strictly managed in a machine referred to as "primary DNS" which manages a domain thereof, and is sequentially propagated to many DNS cache servers placed in a distributed manner on the Internet. In the IP address conversion, an inquiry is started with the nearest DNS cache server. Since a DNS which is the basis thereof is managed in an extremely robust manner, the cache servers may become targets of hacker attacks.

In the server certificate issuing system according to the invention, when the verification page is read out by use of the URL, it is confirmed that the IP address of the Web server which can be obtained is identical to 1) the IP address obtained by directly inquiring of a DNS managing an appropriate domain registered in Whois DB, that is, the primary DNS and a secondary DNS, or 2) the IP address obtained by directly inquiring of a DNS managed and operated by a trusted third-party authority. Thereby, a local corruption of the DNS is detected by directly inquiring of the base DNS for which DNS information overwrite attacks targeted at the DNS cache servers are detected, or inquiring of a third major DNS which is strictly managed. Therefore, confirmation that the conversion from the common name to the IP address and the conversion from the IP address to the common name are inextricably linked is also effective in improving the security.

Therefore, the security is dramatically improved by confirming identity between the IP address of the verification page and the IP address of the Web server which has transmitted the application for the issuance of the certificate, and also, for example, confirming identity between the IP address of the verification page at the time of the page verification and a result of directly inquiring of the DNS managing the appropriate domain registered as Whois information and the DNS of the trusted third-party. In other words, the registration server comprises means for obtaining an IP address corresponding to a domain name of the Web server by directly accessing a primary domain name server (DNS) which manages a database storing a relationship between domain names and the IP addresses, and means for comparing the obtained IP address with the IP address of the verification page, and if these IP addresses are not identical to each other, the above described server certificate request can also be processed to be an error.

It should be noted that storing the IP address/URL name at the time of the verification of the verification page as a log history is remarkably useful for analyzing a cause of omission, along with a log history at the control panel side.

The present invention is not limited to the above described embodiments, and various alterations and variations are possible. In the above described embodiments, although the example of making the certificate request in the Web server lent by the hosting provider has been described, the present invention is applicable to all Web servers. In this case, if a person having an ownership of the Web server makes the application for the issuance of the server certificate, the person can make the application for the issuance of the certificate via his/her own Web server.

Moreover, in the above described embodiments, although the embodiment has been described in which the entry screen generating means, the password generating means and the verification page generating means are loaded on the control panel, the present invention is also applied to the case where these means are loaded in the Web server and not loaded on the control panel.

Furthermore, in the above described embodiments, although the case where one Web server is managed by one person has been described, the present invention is also applicable to a shared Web server in which one Web server is shared by multiple persons.

Furthermore, in the above described embodiments, the processes from the application for the issuance of the server certificate to the installation of the certificate have been performed under the control of the control panel provided in the Web server. However, it is also possible to directly construct the above described SSL certificate issuing and managing program in the Web server, or also possible to construct the above described SSL certificate issuing and managing program as an additional function in the Web server in a plug-in manner.

What is claimed is:

1. A server certificate issuing system comprising a registration server provided in a registration authority to receive a server certificate request transmitted from a Web server via a network and to transmit a certificate signing request file (CSR) to an issuing authority after performing a predetermined examination, and a certificate issuing server provided in the issuing authority to receive the CSR transmitted from the registration server, to generate a server certificate with a digital signature, and to transmit the generated server certificate to said registration server, wherein said Web server comprises
> a processor and memory storing instructions executed by the processor for:
> generating the server certificate request containing at least the address information of said Web server,
> transmitting the server certificate request to the registration server provided in the registration authority, and
> generating a verification page and indicating verification information used for user authentication on said verification page,
> wherein said registration server comprises a processor and memory storing instructions executed by the registration server's processor for:
> receiving the server certificate request transmitted from said Web server,
> accessing the verification page of the Web server based on the address information contained in the received server certificate request to read out the verification information indicated on the verification page,
> comparing the read verification information with the information contained in the server certificate request to verify whether or not the verification page has been generated,
> generating a key pair of a public key and a private key,
> generating the CSR including the generated public key,
> transmitting the generated CSR to the certificate issuing server,
> receiving the server certificate transmitted from the certificate issuing server, and
> transmitting the received server certificate to said Web server, and
> wherein said registration server transmits the CSR to the certificate issuing server only when said comparing verifies that the verification page has been generated.

2. The server certificate issuing system according to claim 1, wherein
> said Web server further executes instructions for generating verification data, and the Web server indicates the verification data generated on the verification page as the verification information, and wherein
> said Web server generates the server certificate request including the generated verification data, and wherein the registration server compares the read verification information with the verification data contained in the server certificate request to verify whether or not the verification page has been generated.

3. The server certificate issuing system according to claim 2, wherein said Web server generates random verification data based on random numbers.

4. The server certificate issuing system according to claim 2, wherein said Web server performs an encryption operation for a part of the information contained in the server certificate request using a predetermined encrypting arithmetic formula to generate encrypted verification data, the Web server indicates the encrypted verification data on the verification page as the verification information, and said registration server performs the encryption operation for a part of the information contained in the received server certificate request using said predetermined encrypting arithmetic formula to verify whether the verification page has been generated or not by comparing the generated encrypted data with the verification information read out from the verification page.

5. The server certificate issuing system according to claim 1, wherein the Web server further executes instructions for generating a password, said Web server generates the server certificate request including the generated password, and the registration server encrypts the server certificate and the corresponding private key using the password contained in the server certificate request and downloads the encrypted server certificate and private key to the Web server.

6. The server certificate issuing system according to claim 5, wherein the Web server further executes instructions for encrypting the generated password, said Web server generates the server certificate request including the encrypted password, and the registration server decrypts the encrypted password contained in the server certificate request to encrypt the server certificate and the corresponding private key using the decrypted password.

7. The server certificate issuing system according to claim 6, wherein said encrypted password is encrypted by the public key of the registration authority.

8. The server certificate issuing system according to claim 1, wherein the IP address or FQDN of the Web server or URL information of the verification page is used as the address information of the Web server included in the server certificate request.

9. The server certificate issuing system according to claim 8, wherein the registration server accesses the URL of the verification page contained in the server certificate request to read out the verification information.

10. The server certificate issuing system according to claim 9, wherein said registration server further executes instructions for generating the URL of the verification page using the FQDN or IP address of the Web server and the title of the verification page contained in the server certificate request, and accesses the verification page of the Web server identified by the generated URL to read out the verification information.

11. The server certificate issuing system according to claim 1, wherein said Web server further executes instructions for inquiring of the registration server as to an issuance status of the server certificate, and performs the status inquiry periodically using an assigned application ID as a key.

12. The server certificate issuing system according to claim 11, wherein the registration server further executes instructions for storing the server certificate transmitted from the certificate issuing server in a download area, responding to the status inquiry transmitted from said Web server, and downloading the server certificate stored in the download area to the Web server, and wherein
> when said registration server receives the status inquiry from the Web server, it confirms whether the corresponding server certificate is stored in the download area or not, and if the server certificate is stored, as a response to said status inquiry, the server certificate stored in the download area is downloaded to the Web server, and wherein
> the processes from the application for issuance of the server certificate to the downloading of the issued server certificate to the Web server are automatically executed in series.

13. The server certificate issuing system according to claim 11, wherein said Web server further comprises a control panel to configure and manage a Web function and a mail function of said Web server, and wherein said control panel generates an entry screen to input application information, a password, the verification page, the server certificate request, and the status inquiry.

14. The server certificate issuing system according to claim 1, wherein said Web server is managed by a hosting provider.

15. The server certificate issuing system according to claim 14, wherein an administrator of the Web server accesses the Web server managed by him/her via a terminal and the network, opens an entry screen to input application information of the server certificate, and inputs required application details into the entry screen.

16. The server certificate issuing system according to claim 1, wherein said registration server further executes instructions for obtaining an IP address corresponding to a domain name of said Web server by directly accessing a primary domain name server (DNS) which manages a database storing a relationship between domain names and IP addresses, and comparing the obtained IP address with an IP address of the verification page, wherein if both the IP addresses are not identical to each other, the server certificate request is processed to be an error.

* * * * *